May 17, 1932.  C. R. RANEY  1,859,168
WINDROW HARVESTER
Filed Sept. 20, 1930
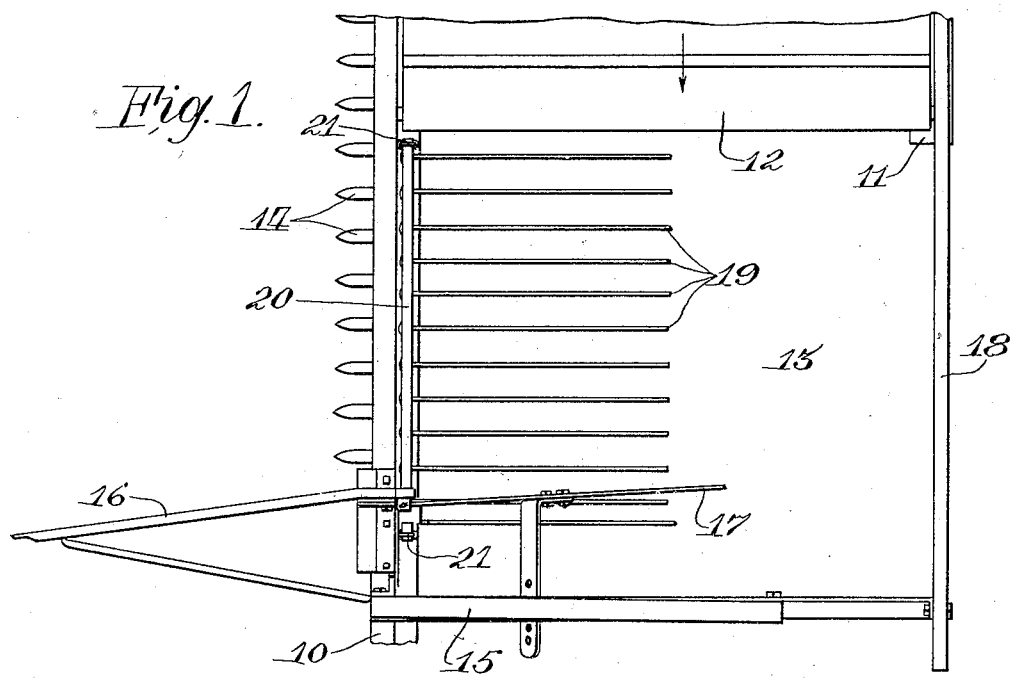
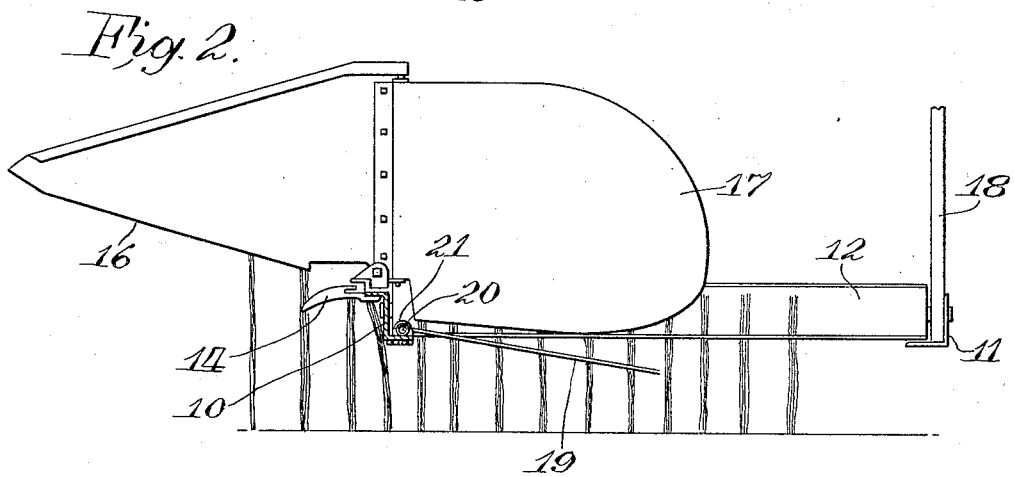
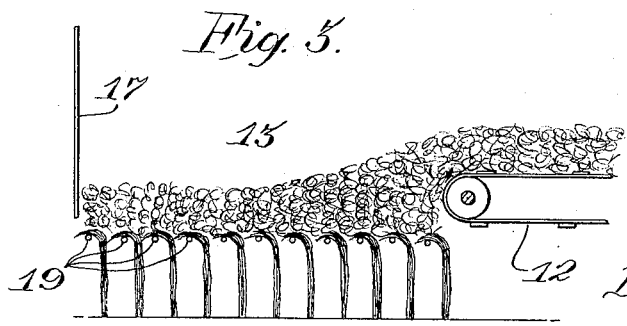

Patented May 17, 1932

1,859,168

UNITED STATES PATENT OFFICE

CLEMMA R. RANEY, OF RIVERSIDE, ILLINOIS, ASSIGNOR TO INTERNATIONAL HARVESTER COMPANY, A CORPORATION OF NEW JERSEY

WINDROW HARVESTER

Application filed September 20, 1930. Serial No. 483,147.

This invention relates to a windrow harvester or swathing machine.

In a prior patent granted to this applicant, to-wit, No. 1,734,401 issued November 5, 1929, for a windrow harvester, there is disclosed a means in the form of a plate arranged behind a length of the cutting apparatus and in a platform opening, which plate receives the grain from the platform conveyer to retard the momentum of discharge of the grain and to lay the same in a relatively quiescent state on the tops of the bent over stubble, said plate having performed the additional function of engaging the field stubble and deflecting or bending the same ahead. This results in a windrow supported on the tops of bent over stubble, which stubble functions as a springy mat to hold the windrow well up above the ground where the action of wind and sun can best cure the grain.

This invention is quite similar to the disclosure of the patent mentioned, but particularly relates to the provision of a modified means for retarding the flow of grain from the platform conveyer and for laying the same in a windrow on the tops of bent over stubble, as will later more fully appear.

The objects of this invention are to provide an improved windrow harvester, and particularly a novel device for permitting the discharging grain itself to bend over the stubble in forming the mat, and assisting in laying the windrow.

These objects may be achieved briefly by the illustrative example of the invention shown in the accompanying sheet of drawings, in which:

Figure 1 is a plan view of so much of a windrow harvester as is necessary to illustrate the invention;

Figure 2 is an end view, partly in section, looking from the stubbleward to the grainward end of the platform; and, Figure 3 is a schematic rear view of the windrow forming means.

For a complete disclosure of a windrow harvester of this type, reference should be made to the prior patent heretofore mentioned. The windrow harvester here shown comprises a front, transverse Z-bar 10 and a rearwardly spaced, parallel, transversely disposed angle bar 11, said bars carrying a transversely running conveyer 12 moving, as shown by the arrow in Figure 1, in the direction of an opening 13 located directly behind a length of the front Z-bar 10. This Z-bar carries in a conventional manner a cutting mechanism indicated by the guard fingers 14 and it is to be noted from Figure 1 that said cutting mechanism also runs directly in front of said opening 13. The Z-bar 10 carries the usual frame work 15 arranged at the stubbleward end of the machine, and this frame work, along with the Z-bar 10, carries in any appropriate manner the inside divider 16 and inside shield 17 extending rearwardly of the Z-bar 10 into the opening 13.

The usual backboard 18 is included in this header construction, said backboard being provided with an opening in line with the platform opening 13, as shown and described in the previous patent, so that the backboard will not constitute any obstruction to the windrow being laid in the field.

Instead of using the solid plate of the prior patent as the windrow forming and laying medium in the opening 13, this invention provides a series of spaced tines or fingers 19, which are connected at their front ends to a transversely arranged pipe or bar 20 that is made fast at its ends, by means of U-bolts 21, to the Z-bar bottom flange. In the normal operating position, these fingers 19 will be inclined slightly downwardly and rearwardly in a longitudinal direction within the platform opening 13, and will move through the stubble somewhat below the tops thereof.

In operation, the cutting mechanism 14 cuts the grain which falls back with the aid of the usual reel (not shown) onto the stubblewardly moving conveyer 12, and as a result, the grain is discharged with considerable force onto the fingers 19 that serve to receive the grain in a manner to cause it to slide slowly and in a quiescent state rearwardly as the machine travels ahead, into the opening 13, and onto the stubble which has been made by the length of the cutting mechanism directly in advance of the platform opening 13. It is to be understood that the crop cut in advance of the opening 13 merely falls back onto the fingers 19 as it does on the plate of the prior patent.

Due to the fact that the grain is discharged laterally from the conveyer 12 with considerable force, the tops of the stubble shown in Figure 2 and in Figure 3 are deflected laterally in a stubbleward direction, which causes the tops of the stubble to be bent over in hair-pin fashion across the tops of the fingers 19, as shown in Figure 3. Thus, the fingers 19 in addition to laying the grain in a relatively quiescent state cooperate with the force of the discharging grain from the conveyer 12 to cause the discharging crop itself to bend over the stubble tops laterally to prepare a springy stubble mat upon which the grain slides from the fingers 19 in such a manner that the grain in the windrow then is supported above the ground where it can best cure.

The inclination of the fingers 19 can be readily changed by means of the U-bolts 21, which fact makes it possible to rock the bar 20 to set the fingers in any desired angular position of adjustment with respect to the Z-bar support 10.

From this disclosure it will be apparent that an improved mechanism has been provided for a windrow harvester that causes the stubble tops to be deflected in a lateral direction when preparing the stubble mat and that the windrow is laid on such prepared stubble mat in a relatively quiescent state. The fingers 19 in an obvious manner merely pull through the stubble and the stubble mat prepared thereabove and in no way interfere with the windrow in formation.

Obviously the particular form of retarder and stubble mat preparing mechanism may assume other forms than that herein chosen by way of example and, accordingly, it is the intention to cover all such changes as do not depart from the spirit and scope of the invention as expressed in the following claims.

What is claimed is:

1. In a windrow harvester, means to cut the crop, means to receive and move the crop laterally of the line of draft to a point of discharge, and means utilizing the force of discharge of the crop for bending tops of stubble laterally, said means also serving to lay the cut crop in a windrow on such bent over stubble tops.

2. In a windrow harvester, means to cut the crop, means to receive and move the crop laterally of the line of draft to a point of discharge, and means whereby the discharging crop acts to bend the tops of stubble laterally, said means also serving to lay the cut crop in a windrow on such bent over stubble tops.

3. In a windrow harvester, means to cut the crop, means to receive and move the crop to a point of discharge, and fingers positioned at the point of discharge and movable through stubble whereby the discharging crop will bend said stubble tops over the fingers, means also serving to lay the cut crop in a windrow on such bent over stubble tops.

4. In a windrow harvester, means to cut the crop, means to receive and move the crop transversely to a point of discharge, and longitudinally disposed means positioned at said point of discharge utilizing the force of discharge of the crop for bending stubble, said means also serving to lay the cut crop in a windrow on such bent over stubble.

5. In a windrow harvester, means to cut the crop, means to receive and move the crop to a point of discharge, inclined fingers positioned at the point of discharge and movable through stubble whereby the force of discharge of the crop serves to bend the stubble tops over said fingers, said means also serving to lay the cut crop in a windrow on such bent over stubble tops, and means for setting the fingers in different inclined positions relative to their support.

6. In a windrow harvester, means to cut the crop, means to receive and move the crop to a point of discharge, and means moving through stubble at the point of discharge, said means receiving the discharged crop in a manner to cause the stubble tops to be bent over laterally by the force of discharge of the crop and retarding its discharge into a windrow.

7. In a windrow harvester, means to cut the crop, means to receive and move the crop transversely of the line of draft to a point of discharge, and means moving longitudinally through stubble at said point of discharge, said means receiving the discharged crop in a manner to cause the stubble tops to be bent over laterally by the force of discharge of the crop and retarding its discharge into a windrow.

8. In a windrow harvester, means to cut the crop, means to receive and move the crop to a point of discharge, and fingers positioned at the point of discharge and moving through stubble, said fingers receiving the discharged crop in a manner to cause the stubble tops projecting upwardly therethrough to be bent over laterally of the line of draft by the force of discharge of the crop and retarding its discharge into a windrow.

9. In a windrow harvester, means to cut the crop, means to receive and move the crop to a point of discharge, a support, means connected to the support and movable through stubble, said means being inclined and receiving the discharged crop in a manner to cause the stubble to be bent over by the force of discharge of the crop and retarding its discharge into a windrow, and means for setting the inclined means in different angular positions relative to its support.

10. In a windrow harvester, means to cut the crop, means to receive and move the crop to a point of discharge, and spaced, stiff fingers moving through stubble at said point of discharge, said fingers receiving the discharged crop in a manner to cause the stubble tops projecting upwardly therebetween to be bent over laterally of the line of draft by the force of discharge of the crop, said fingers serving also to retard discharge of the crop into a windrow.

11. A windrow harvester comprising, in combination, means for cutting a crop, means to receive and move the cut crop laterally of the line of draft to a point of discharge, and means at said point for causing the discharged crop to bend over stubble tops laterally to prepare an elevated stubble mat upon which the windrow is laid.

12. A windrow harvester comprising, in combination, means for cutting a crop, means to receive and move the cut crop to a point of discharge, and means at said point for causing the discharged crop to bend over stubble laterally with respect to the line of travel to prepare a stubble mat upon which the windrow is laid.

13. A windrow harvester comprising, in combination, means for cutting a crop, means to receive and move the cut crop laterally of the line of draft to a point of discharge, and inclined means at said point for causing the discharged crop to bend over stubble tops laterally to prepare an elevated stubble mat upon which the windrow is laid.

14. A windrow harvester comprising, in combination, means for cutting a crop, means to receive and move the cut crop laterally of the line of draft to a point of discharge, and fingers at said point movable through stubble for causing the discharged crop to bend over stubble tops to prepare an elevated stubble mat upon which the windrow is laid.

15. A windrow harvester comprising, in combination, means for cutting a crop, means to receive and move the cut crop laterally of the line of draft to a point of discharge, and inclined fingers spaced apart at said point and movable through stubble for causing the discharged crop to bend over stubble tops to prepare an elevated stubble mat upon which the windrow is laid.

16. A windrow harvester comprising, in combination, a cutting mechanism with a discharge opening therebehind between the ends of the cutting mechanism, a conveyer to receive the cut crop and to discharge it into said opening, and means in said opening enabling the discharged crop to bend over stubble tops laterally of the line of draft and prepare an elevated stubble mat upon which the crop is laid in a windrow.

17. A windrow harvester comprising, in combination, a cutting mechanism with a discharge opening therebehind between the ends of the cutting mechanism, a conveyer to receive the cut crop and to discharge it into said opening, and fingers in said opening enabling the discharged crop to bend over stubble and prepare a stubble mat upon which the crop is laid in a windrow.

18. A windrow harvester comprising, in combination, a cutting mechanism with a discharge opening therebehind between the ends of a cutting mechanism, a conveyer to receive the cut crop and to discharge it into said opening, and inclined means in said opening enabling the discharged crop to bend over stubble tops in a direction laterally of the line of draft and prepare an elevated stubble mat upon which the crop is laid in a windrow.

19. A windrow harvester comprising, in combination, a cutting mechanism with a discharge opening therebehind between the ends of the cutting mechanism, a conveyer to receive the cut crop and to discharge it transversely of the line of draft into said opening, and means in said opening to hold the stubble while enabling the discharged crop to bend over the tops of said stubble laterally to prepare an elevated stubble mat upon which the crop is laid in a windrow.

20. A windrow harvester comprising, in combination, a cutting mechanism with a discharge opening therebehind between the ends of the cutting mechanism, a conveyer to receive the cut crop and to discharge it into said opening, a support, means in said opening connected to the support enabling the discharged crop to bend over stubble and prepare a stubble mat upon which the crop is laid in a windrow, and means for setting said means in different angular positions relative to said support.

In testimony whereof I affix my signature.

CLEMMA R. RANEY.